United States Patent
Brandsma et al.

(10) Patent No.: US 10,223,554 B2
(45) Date of Patent: Mar. 5, 2019

(54) LOCALIZATION METHOD, COMPUTER PROGRAM PRODUCT AND LOCALIZATION DEVICE

(71) Applicant: NXP B.V., Eindhoven (NL)

(72) Inventors: Ewout Brandsma, Eindhoven (NL); Maarten Christiaan Pennings, Waalre (NL); Timo van Roermund, Eindhoven (NL); Stefan Drude, Waalre (NL)

(73) Assignee: NXP B.V., Eindhoven (NL)

(*) Notice: Subject to any disclaimer, the term of this patent is extended or adjusted under 35 U.S.C. 154(b) by 923 days.

(21) Appl. No.: 13/692,973

(22) Filed: Dec. 3, 2012

(65) Prior Publication Data
US 2013/0141223 A1 Jun. 6, 2013

(30) Foreign Application Priority Data
Dec. 5, 2011 (EP) .................................. 11191881

(51) Int. Cl.
*G06K 7/01* (2006.01)
*G05B 15/02* (2006.01)

(52) U.S. Cl.
CPC ............ *G06K 7/01* (2013.01); *G05B 15/02* (2013.01); *G05B 2219/1101* (2013.01); *G05B 2219/2642* (2013.01)

(58) Field of Classification Search
CPC ....................................................... G06K 7/01
USPC ....................................................... 340/10.5
See application file for complete search history.

(56) References Cited

U.S. PATENT DOCUMENTS

| 5,781,150 A * | 7/1998 | Norris ................... G01C 21/20 342/357.34 |
| 6,487,425 B1 * | 11/2002 | Thakker ............ H04W 52/0225 340/7.36 |
| 6,563,430 B1 * | 5/2003 | Kemink ........... H04N 21/42202 340/12.22 |

(Continued)

FOREIGN PATENT DOCUMENTS

| CN | 1741028 A | 3/2006 |
| CN | 101127090 A | 2/2008 |

(Continued)

OTHER PUBLICATIONS

Wi-Fi Alliance, "Wi-Fi Simple Configuration, Technical Specification", Version 2.0.2; 154 pages; (Jan. 30, 2012).

(Continued)

*Primary Examiner* — Vernal U Brown

(57) ABSTRACT

According to an aspect of the invention a localization method for localizing a host device (100) in a control system, in particular a building control system, is provided, the localization method comprising determining geographical location information of the host device (100) by means of a localization device (102) and associating the geographical location information with a unique identifier of the host device (100). According to another aspect of the invention a computer program product is provided that comprises program instructions which, when being executed by one or more processing units, cause said processing units to carry out or control the steps of the inventive localization method. According to another aspect of the invention, a localization device (102), in particular a portable localization device is provided for use in the inventive localization method.

18 Claims, 2 Drawing Sheets

(56) References Cited

U.S. PATENT DOCUMENTS

| | | | |
|---|---|---|---|
| 7,174,227 B2 | 2/2007 | Kobayashi et al. | |
| 7,363,028 B2* | 4/2008 | de Clerq | G05B 15/02 370/252 |
| 7,378,968 B2 | 5/2008 | Wang et al. | |
| 7,825,776 B2 | 11/2010 | Smith et al. | |
| 2005/0030160 A1* | 2/2005 | Goren et al. | 340/10.5 |
| 2005/0159823 A1* | 7/2005 | Hayes | G05B 15/02 700/19 |
| 2006/0091207 A1 | 5/2006 | Chang | |
| 2006/0284727 A1* | 12/2006 | Steinke | 340/10.31 |
| 2007/0017986 A1* | 1/2007 | Carrender | G06K 19/07749 235/435 |
| 2007/0047749 A1 | 3/2007 | Kasztelan et al. | |
| 2010/0198367 A1 | 8/2010 | Petricoin et al. | |
| 2011/0143661 A1 | 6/2011 | Hartwig et al. | |
| 2013/0076491 A1 | 3/2013 | Brandsma et al. | |
| 2013/0104238 A1* | 4/2013 | Balsan | G06Q 30/0207 726/26 |
| 2013/0198813 A1 | 8/2013 | Van Roermund et al. | |
| 2013/0211761 A1 | 8/2013 | Brandsma et al. | |
| 2013/0271268 A1 | 10/2013 | Brandsma et al. | |
| 2013/0312072 A1 | 11/2013 | Van Roermund et al. | |

FOREIGN PATENT DOCUMENTS

| | | |
|---|---|---|
| DE | 10 2006 035 011 A1 | 1/2008 |
| EP | 1 956 312 A2 | 8/2008 |
| EP | 2 050 863 A1 | 4/2009 |
| EP | 12182670 | 8/2012 |
| WO | 2006/021570 A1 | 3/2006 |
| WO | 2009/128001 A2 | 10/2009 |
| WO | 2010/032227 A1 | 3/2010 |
| WO | 2011/107878 A1 | 9/2011 |

OTHER PUBLICATIONS

NFC Forum; "Connection Handover, Technical Specification", Version 1.2; 27 pages; (Jul. 7, 2010).

OpenWave; "Overview of Location Technologies—presentation,"; retrieved from the internet http://www.ipcgps.com/uploads/docs/Intro_to_Location_Technologies-1.pdf; 12 pages (Nov. 19, 2002).

Wikipedia; "Differential GPS"; retrieved from the internet http://en.wikipedia.org/wiki/Differential_GPS 2014 (1 page).

Hammond, J.C. et al; "Integrating augmented reality with home systems"; Proc. 1$^{st}$ Euro. Conf. Disability Virtual Reality & Assoc. Tech., Maidenhead, UK; 10 pages (1996).

Brower, Jeff; "[Discuss-gnuradio] UK shops track customers via GNU Radiomonitoring"; retrieved from the internet http://lists.gnu.org/archive/html/discuss-gnuradio/2008-05/msg00199.html on Mar. 3, 2014; 3 pages (May 20, 2008).

Extended European Search Report for Application No. 11191881.9 (dated May 10, 2012).

Times Online, "Shops track customers via mobile phone", http://technology.timesonline.co.uk/tol/news/tech_and_web/article3945496.ece, 3 pages.

TNO & Halmos; "Kwaliteitsborging van installaties (Evaluating existing tools and a vision for the future)", retrieved from the internet https://www.rvo.nl/sites/default/files/bijlagen/Rapport%20Kwaliteitsborging%20van%20installaties.pdf, google machine translation of cover and pp. 4 and 5; 79 pages (Jun. 2006).

Office Action from counterpart application CN 201210510000.7 (dated Mar. 30, 2015).

ST Microelectronics; "STMicroelectronics Faciltates Contactless Communication between Mobile Phones and Other Electronic Device"; retreived from the Internet http://ww.st.com; 2 pages (dated Jan. 19, 2012).

* cited by examiner

LOCALIZATION METHOD, COMPUTER PROGRAM PRODUCT AND LOCALIZATION DEVICE

CROSS-REFERENCE TO RELATED APPLICATIONS

This application claims the priority under 35 U.S.C. § 119 of European Patent application no. 11191881.9, filed on Dec. 5, 2011, the contents of which are incorporated by reference herein.

FIELD OF THE INVENTION

The invention relates to a localization method for localizing a host device in a control system, in particular a building control system. Also, the invention relates to a computer program product comprising program instructions which, when being executed by one or more processing units, cause said processing units to carry out or control the steps of the localization method. Furthermore, the invention relates to a localization device, in particular a portable localization device, for use in a localization method.

BACKGROUND OF THE INVENTION

Modern building control systems comprise a large number of devices, for example sensors, lights, valves, HVAC equipment and security equipment. In the context of the present invention these devices are referred to as host devices. The most advanced buildings are approaching one host device installed per square meter. The commissioning of building control systems is increasingly labor intensive and prone to errors. For example, it has been shown that the technical installations in 70% of the utility buildings in the Netherlands do not function according to specification, causing an increase in energy consumption of 25%.

Commissioning of building control systems involves localization of host devices followed by establishing control relationships between these devices. The latter is referred to as the configuration of the host devices. For example, a valve controlling the heating unit in a particular room must be connected to the temperature sensor in that very same room. Also, in case one of these devices fails, it is necessary to know where the device is located in order to be able to replace or repair it.

It is noted that, in the context of the present invention, the complete system comprising sensors, actuators, and controllers used to control HVAC, lighting, security, and safety in a building is called a building control system (BCS). A component (e.g. a computer) or a subsystem of the BCS that is used to commission the BCS initially and possibly to (partially) re-commission it later is referred to as a building commissioning system.

Typically, localization methods for localizing host devices in a building control system comprise a step of manually identifying a particular device, for example, by pulling a barcode sticker off that device—the barcode uniquely identifying the device—and sticking it on a technical drawing of the building next to the symbol representing said device. Subsequently, this association between sticker and symbol is input into the building commissioning system through further manual intervention. Clearly, this process is time consuming, expensive and prone to errors. Configuration, i.e. establishing control relationships between devices, is subsequently done by interacting with the building commissioning system.

SUMMARY OF THE INVENTION

It is an object of the invention to improve and simplify localization methods of the kind set forth. This is achieved by a localization method, a computer program product and a localization device.

According to an aspect of the invention a localization method for localizing a host device in a control system, in particular a building control system, is provided, the localization method comprising determining geographical location information of the host device by means of a localization device and associating the geographical location information with a unique identifier of the host device.

According to a further aspect of the invention the localization device reads a machine-readable unique identifier attached to the host device, the localization device determines the geographical location information of the host device based on its own geographical location, and the localization device associates the geographical location information with said machine-readable unique identifier.

According to a further aspect of the invention the machine-readable unique identifier is one of the group consisting of a barcode, a QR-code and an RFID tag.

According to a further aspect of the invention the localization device determines the geographical location information of the host device based on its own geographical location, the localization device writes the geographical location information into a memory unit of the host device, and the host device associates the geographical location information with its unique identifier.

According to a further aspect of the invention the memory unit is comprised in an RFID tag connected to the host device.

According to a further aspect of the invention the localization device writes the geographical location information into the memory unit of the RFID tag while the host device is in an off state or a low-power state.

According to a further aspect of the invention the RFID tag wakes up the host device in response to the writing of the geographical location information into the memory unit by the localization device.

According to a further aspect of the invention the host device is one of the group consisting of a sensor, a luminary or a HVAC-related actuator.

According to a further aspect of the invention the geographical location information of the host device is derived from the geographical location of the localization device by determining the direction and the distance of the host device relative to the localization device.

According to another aspect of the invention, a method for configuring a building control system is provided comprising the steps of performing a localization method of the kind set forth and subsequently using the geographical location information of the host device to establish at least one control relationship between the host device and further host devices in the building control system.

According to another aspect of the invention a computer program product is provided which comprises program elements executable by the localization device or the host device, wherein each program element comprises program instructions which, when being executed by said localization device or host device, cause said localization device or host device to carry out or control respective steps of the inventive localization method.

According to another aspect of the invention, a localization device, in particular a portable localization device, is provided for use in the inventive localization method.

According to a further aspect of the invention the localization device comprises a user interface for manually determining the geographical location information.

According to a further aspect of the invention the user interface comprises a touch screen for displaying a map and the localization device is arranged to determine the geographical location information by sensing a touched position on said map.

According to a further aspect of the invention the localization device comprises a user interface for manually refining automatically determined geographical location information.

According to a further aspect of the invention the localization device is arranged to determine its own geographical location by receiving an input signal from a global positioning system or an indoor positioning system.

According to a further aspect of the invention the localization device is arranged to receive further location-related information through at least one of the group of: a keyboard for capturing user input; a microphone for capturing user input; an RFID interface for reading out an RFID tag carrying information indicative of the location of an object to which the RFID tag is attached.

BRIEF DESCRIPTION OF THE DRAWINGS

The invention will be described in more detail with reference to the appended drawings, in which.

DESCRIPTION OF EMBODIMENTS

According to an aspect of the invention a localization method is provided to determine the location of a first device (host device) in a structure, such as a building, using a second device (localization device). The host device may, for example, be a building automation device such as a sensor, a luminary or a HVAC-related actuator. The localization device may be a portable device which comprises means for determining either manually and/or automatically said location.

The host device and the localization device also comprise an interface via which they can communicate with each other when they are brought in close proximity of each other or when they are otherwise lined-up physically through explicit user interaction. In the following, alternative exemplary embodiments will be described which deploy different methods of interaction over the interface.

Figure 1:
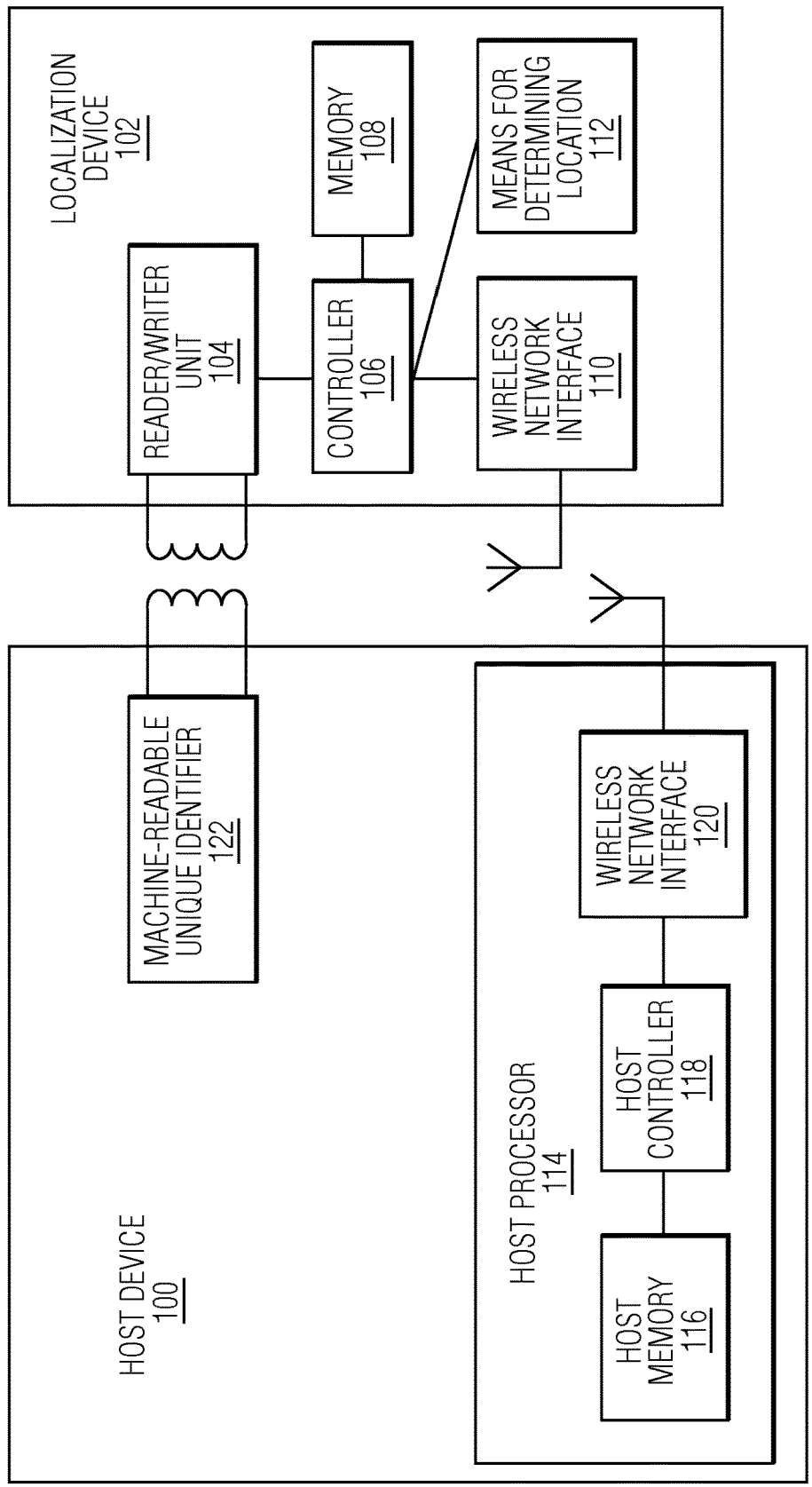
FIG. 1 shows a first exemplary embodiment of the invention.

FIG. 1 shows a first exemplary embodiment of the invention. According to the first exemplary embodiment, the interface of the host device 100 is a machine-readable unique identifier 122 such as a barcode, a QR-code or an RFID-tag, which is typically attached to the housing of the host device 100. The interface of the localization device 102 is a compatible reader unit 104 for the machine-readable identifier 122, for example a barcode reader, a QR-code reader or an RFID tag reader such as an NFC device. According to the first exemplary embodiment the method comprises the following steps:

1. the localization device 102 reads the unique identifier 122 of the host device 100 in response to a user bringing it in close proximity of the host device 100, or by otherwise aligning the localization device 102 and the host device 100 as needed for reading a barcode or a QR-code, for example;

2. the localization device 102 determines the geographical location information of the host device 100;

3. the localization device 102 associates the geographical location information with the unique identifier of the host device 100.

This association can subsequently be stored in the localization device 102 for further processing at a later moment in time or it can be transmitted over a wireless network interface to a building commissioning system, for example.

Figure 2:
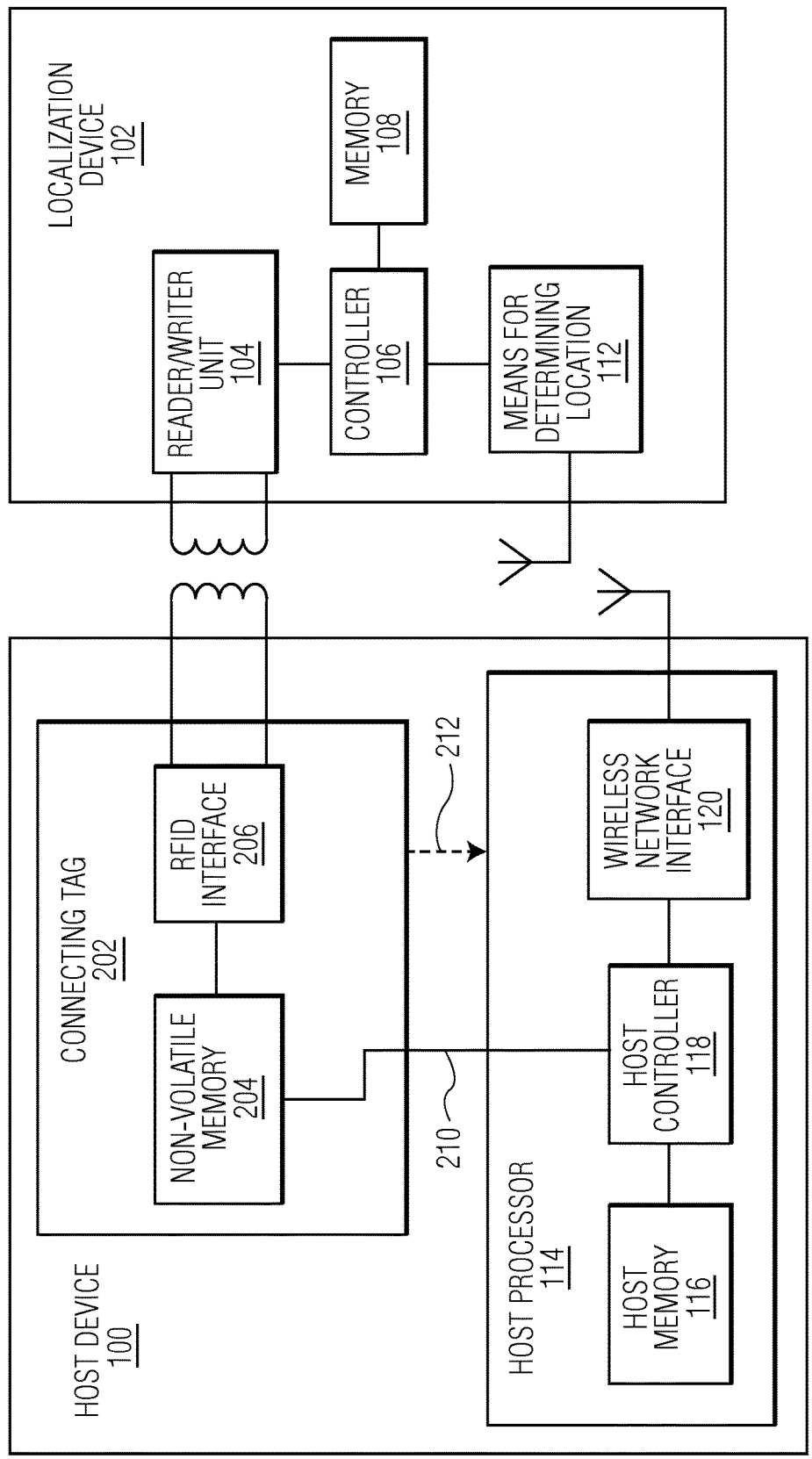
FIG. 2 shows a second exemplary embodiment of the invention.

FIG. 2 shows a second exemplary embodiment of the invention. According to the second exemplary embodiment, the interface of the host device 100 is a so-called connected RFID tag 202. The host device 100 furthermore comprises a host controller 118. The connected tag comprises a non-volatile memory 204, an RFID interface 206 for contactless writing into the non-volatile memory 204 and a wired connection 210 with the host controller 118 of the host device 100 for reading from the non-volatile memory 204 by that host controller 118. The interface of the localization device 102 is an RFID writer 104 (such as an NFC device) capable of writing into the non-volatile memory 204 of the connected tag 202 through its RFID interface 206. According to the second exemplary embodiment, the method comprises the following steps:

1. the localization device 102 determines the geographical location information prior or in response to a user bringing it in close proximity of the host device 100;

2. the localization device 102 writes the geographical location information into the non-volatile memory 204 of the connected tag 202 of the host device 100 through its RFID interface 206;

3. the host controller 118 of the host device 100 reads the geographical location information from the non-volatile memory 204 either following immediately step (2) or at a later moment in time.

According to this alternative embodiment, the host device 100 receives the information about its geographical location from the localization device 102. The host device 100 may subsequently share this information—together with its own unique identifier—with other devices over wireless network interface, for example.

The benefit of either embodiment lies in the fact that localization is done instantly on-the-spot. Localization involves the single action of holding the localization device in close proximity of the host device or otherwise lining them up and optionally—previously, simultaneously, or successively in case of the first embodiment—indicating a position on a map. It may be possible to perform localization according to the invention in a single combined action together with a method for NFC/RFID-based network joining. The localization method according to the invention takes less effort and is less prone to errors than the prior art method involving barcode stickers on a map, which subsequently have to be entered into a building commissioning system.

It is noted that, instead of a building automation device, the host device may be any device which is installed in a fixed location within a building or structure and for which knowing that location is beneficial for managing it. For example, a Smart Grid enabled appliance is already connected to a control network and may even support NFC/RFID network joining. Adding localization according to one of the methods of the invention can then be achieved at minimal cost and effort.

There are various ways to determine the geographical location information. In principle, the localization device is arranged to determine the geographical location information of the host device based on its own geographical location. The geographical location of the host device is assumed to be substantially the same as the geographical location of the localization device because, in order to execute the localization method, they are at least brought in close proximity to each other.

The host device is assumed to have the same location as the localization device while the latter is reading the unique identifier. Especially for short range readout—for an RFID-tag this is just a few centimeters—this should suffice.

In some cases, however, it may be necessary and possible to read the unique identifier from a distance, e.g. reading the barcode or QR-code from a device installed high on the ceiling. In this case, the abovementioned assumption is no longer correct. To correct the location for this distance an additional technology may be used. For example, the direction and the distance of the host device relative to the localization device may be determined by means of the wireless network interface using techniques such as ranging (distance) and beam forming (direction) or by using another modality such as ultrasound. Note that also in these cases the localization device determines the geographical location information of the host device based on its own geographical location, but additional measures are needed to derive the geographical location of the host device from the geographical location of the localization device. Thus, the geographical location information of the host device may be derived from the geographical location of the localization device by determining the direction and the distance of the host device relative to the localization device.

Manual means for determining the location may involve a touch screen displaying a map of the structure. Touching a position on the map determines the location. Instead of a touch screen also a screen with another type of pointing device, such as a touch pad, may be used.

Automatic means for determining location may be a global positioning system or an indoor positioning system. An example of an indoor positioning system is an in-building system involving fixed beacons mounted in known locations within the structure and methods to determine position relative to the beacons (e.g. trilateration, triangulation). Also, cell phone network based techniques can be used to determine a position, for example Advanced Forward Link Trilateration (AFLT) for CDMA and Enhanced Observed Time Difference (EOTD) for GSM, but for in-building applications these will normally not be sufficiently accurate.

A third option is to combine automatic and manual means for determining the location. In this case, the automatic positioning means may be relatively coarse and not offer sufficient resolution for fully automatic positioning. It may, for example, be used to scroll or zoom the map to display the part of the structure (building) where a user is currently located. Subsequently, the user can touch a position on that zoomed map to determine the location of the first device with sufficient accuracy. Thus, in this case the user interface enables manual refining of automatically determined geographical location information.

Even when automatic positioning is relatively accurate (e.g. having a resolution of about one decimeter) there may be some cases where the locations of two first devices are indistinguishable, e.g. as is the case when two light switches are mounted directly adjacent to each other on a wall. In this case, manual interaction may be required to resolve the issue.

Instead of, or in addition to, map-based or automatic means for determining the location, other location-related information (e.g. room number) could be entered using e.g. a keyboard, a microphone or an RFID-tag. The RFID-tag (sticker) is attached to certain objects and has information about the location of those objects stored on it. For example, outside an office next to the door there is often a sign displaying a room number and the names of the inhabitants. An RFID-sticker containing the same information in electronic form—and/or (x, y, z)-coordinates of the room—could be attached to that sign. Similarly, all desks—or phones or PCs on those desks—in an office could be equipped with RFID-stickers containing the identity of its regular occupant.

Automatic means for determining location have the benefit of requiring minimal user interaction. The only action is to bring the host device and the localization device in close proximity of each other. This may already have to be done in the context of network joining, in which case the incremental user interaction required for localization may be zero.

Although a very sensitive (indoor) GPS receiver may be relatively costly, according to some embodiments of the invention this receiver is only part of the localization device. The localization device typically will be a piece of professional equipment in ownership of an installation company that may be used for commissioning a large number of host devices in a plurality of buildings. This implies that the relative cost is low.

Global positioning system (GPS) accuracy can be enhanced significantly by using Differential GPS. In the most optimal case this may offer a resolution of under 10 cm, at least outdoors. The basic principle of Differential GPS is to have a GPS receiver at a fixed known location. It can be used to compensate for ionospheric effects as well as errors in the satellite position ephemeris data and clock drift on the satellites. The GPS receiver at the fixed known location transmits its offset data over a radio link for other GPS receivers to use. Either an existing nearby DGPS service could be used or a dedicated one could be installed near the building to be commissioned.

Cell-phone network based techniques are normally less accurate than GPS: AFLT and EOTD are the best known methods with an accuracy between 50 and 200 m. This makes them less suitable for building commissioning, but in larger structures they could be usable. It is noted that AFLT and EOTD are often used as backup methods in case GPS fails. Beacon-based systems based on techniques such as ranging may exhibit centimeter resolution as a result of which manual effort (and the associated probability of errors) is limited to a minimum. Clearly, beacon-based systems involve additional investments in building equipment (i.e. beacons), but these may be used for asset and people tracking purposes as well. Alternatively, the beacons could be installed temporarily for the duration of the commissioning process. Note, however, that the host devices need not be equipped with potentially expensive hardware for beacon-based positioning. Apart from the beacons themselves only the localization device is equipped with this technology. As mentioned above, the cost of the localization device is not a problem.

Furthermore, it is noted that some beacon-based systems involve the beacons sending signals and the mobile device to be localized (i.e. the localization device which determines its own geographical location in accordance with the invention) performing trilateration, whereas other beacon-based systems involve the mobile device to be localized to send signals and the beacons using triangulation and/or trilateration to determine its location. In the latter case, the term 'beacon' is less appropriate because the 'beacon' is only listening. An example of the latter type of system is a GSM-tracking system as employed in shopping malls to monitor the shopping behavior of customers carrying an off-the-shelf phone. So, one example of a localization device according to the invention might be an off-the-shelf smart phone, where a set of 'beacons' is installed in the building to determine the location of the localization device based on the 'whisperings' of its GSM radio. The location determined by the 'beacons' will be communicated back to the smart phone e.g. via Wi-Fi for subsequent use according to one of the embodiments of the invention.

Manual means for determining the location (i.e. map touching) are very intuitive to an end-user. Furthermore, the investment cost is almost zero. All present-day smart phones are equipped with cameras that can be used to read barcodes or QR-codes. More and more smart phones are also equipped with NFC devices capable of reading RFID tags as well as writing to (connected) RFID tags. Additionally, a software application running on an off-the-shelf smart phone is required.

According to the first embodiment of the invention, the interface of the host device is a machine-readable unique identifier of the device such as a barcode, a QR-code or an RFID-tag typically attached to the housing of the device. The interface of the localization device is a compatible reader unit for the identifier (e.g. a barcode reader, a QR-code reader, or an RFID tag reader such as an NFC device).

The unique identifier must eventually enable uniquely addressing the host device over a further (wireless) network interface. For example, the identifier may be the MAC-address of the (wireless) network interface of the host device. Alternatively, it may be any unique number, where that number is broadcast in the (wireless) network by e.g. the building commissioning system in order to discover the host device causing the host device to respond with its actual network address.

As outlined above, the method then comprises the steps of:
1. the localization device reading the unique identifier of the first device in response to a user bringing it in close proximity of the host device or otherwise aligning them as needed for e.g. reading a barcode or a QR-code;
2. the localization device determining the location;
3. the localization device associating the location with the unique identifier of the host device.

This association can subsequently be stored by the localization device or be transmitted over e.g. a wireless network interface to, for example, a building commissioning system or to the host device itself. After that the association can for example be used for configuring the building control system.

It should be noted that in the method described above, steps (1) and (2) may essentially happen simultaneously, or the steps may even be interchanged (i.e. step (2) being performed shortly before step (1)). The latter may typically occur when location is determined manually by touching a position on a map displayed on a touch screen. In any case, it is assumed that the determined location substantially corresponds to the actual location of the host device. In case the location is determined automatically, this means that the location is preferably determined when the host device and the localization device are in close proximity of each other, i.e. briefly before, during, or briefly after the unique identifier is read. For example, the localization device may determine the location when it detects the RFID-tag and only read an identifier value stored on it after having determined the location to make sure the location is determined while the localization device is in close proximity of the tag and the host device to which the tag is attached.

As mentioned above, the host device comprises a machine-readable identifier such as a barcode, a QR-code, or an RFID-tag typically attached to the housing of the device. In case the machine-readable identifier is an RFID-tag, it will comprise a coil-antenna. Typically, the host device will be a (wireless) network-enabled device furthermore comprising a (wireless) network interface, a host controller and a host memory. Depending on its specific functionality (e.g. sensor node or actuator node) it may comprise further elements.

As mentioned above, the localization device comprises a compatible reader unit for the identifier (i.e. barcode, QR-code, or RFID-tag reader) and means for determining the location. In case the reader is an RFID-tag reader, it will comprise a coil-antenna. The means for determining the geographical location may be manual or automatic means or a combination thereof. Furthermore, typically, the localization device will also comprise a wireless network interface, a controller and a memory. The wireless network interface may initially be used to transmit the association between the unique identifier of the host device and its location to, for example, a building commissioning system or to the host device itself. This network interface may or may not be directly compatible with the network interface of the host device. The controller and the memory may be used to enable executing a computer program comprising instructions for carrying out the steps of the method of the first embodiment of the invention.

According to the second embodiment of the invention, the interface of the host device is a so-called Connected Tag. The host device furthermore comprises a host controller. The Connected Tag comprises a non-volatile memory, an RFID interface for contactless writing into the non-volatile memory, and a wired connection with the host controller of the host device for reading the non-volatile memory by that host controller. The interface of the localization device is an RFID writer (such as an NFC device) capable of writing into the non-volatile memory of the Connected Tag through its RFID interface. The method then comprises the steps of:
1. the localization device determining the location prior or in response to a user bringing it in close proximity of the host device;
2. the localization device writing that location into the non-volatile memory of the Connected Tag of the host device through its RFID interface;
3. the host controller of the host device reading the location from the non-volatile memory either following immediately step (2) or at some later time.

After performing the steps of this method, the host device is itself aware of its location. The host device can subsequently interact with other location-aware devices and/or a building commissioning system through a wireless network interface to configure the building control system, for example.

Again, it is assumed that the determined location of the localization device substantially corresponds to the actual location of the host device. In case the location is determined automatically, this means that the location is preferably determined when the host device and the localization device are in close proximity of each other. For example, the localization device may determine the location when it detects the Connected Tag.

The host device comprises a Connected Tag and a host controller which are connected via a host connection. Furthermore, typically, the host device will also comprise a (wireless) network interface and a host memory. The (wireless) network interface is initially used to share the association between the unique identity (i.e. (dynamic) network address) and the location of the host device with other devices and/or the building commissioning system. The (wireless) network interface is subsequently used for normal post-commissioning operation. The host memory is used for many purposes, amongst them temporarily storing the location obtained from the Connected Tag. As mentioned, the first device may, for example, be a sensor or actuator node in a building control system. Therefore it may additionally comprise sensor, actuator and/or other elements which are not shown in FIG. 2.

The localization device comprises an RFID writer (such as an NFC device) and means for determining a location. The means for determining a location may be manual or automatic means or a combination thereof. Furthermore, typically, the localization device will also comprise a controller and a memory to enable execution of a computer program comprising instructions for carrying out the steps of the method of the second embodiment of the invention.

It is noted that in a variant of this embodiment the Connected Tag of the host device may be replaced by a full-blown NFC reader which may interact in peer-to-peer or another mode with a full-blown NFC device of the localization device. This variant is less advantageous, because a full-blown NFC device has higher cost and power consumption than a Connected Tag.

Optionally, a wake-up signal can be provided by the Connected Tag to the host controller of the host device as a result of the localization device writing the geographical location information into the non-volatile memory of the host device (i.e. as a result of the execution of step (2) of the method). The wake-up signal can be used to cause the host controller of the host device to proceed with step (3) of the method instantaneously. Instantaneous completion of the method may be beneficial in some cases, for example in case the configuration of the building control system is to follow instantaneously.

The wake-up signal will be raised if the localization device writes the geo-graphical location information into the non-volatile memory of the host device. In particular, when the host device is a wireless sensor node it may be in an off—or very low-power state—when the localization device initiates the localization method. It is beneficial when the user performing the localization operation does not have to switch on the wireless sensor node by means of a button, because the operation becomes simpler and the cost of a button is avoided. Furthermore, adding a button may be impractical in view of the small form factor of the sensor node. Also, the time span between a user pushing the button and subsequently bringing the localization device and the wireless sensor node in close proximity of each other (typically in the order of seconds) may already be too long considering the very limited energy resources of the wireless sensor node.

It should be noted that the use of a wake-up signal from the Connected Tag may also be beneficial if the host device is not in off state or a low-power state. In this case the wake-up signal may serve as an interrupt signal to the host controller, which triggers the host controller to start executing step (3) of the method according to the invention.

A Connected Tag is slightly more costly than a plain (i.e. unconnected) RFID-tag, a barcode or a QR-code. In other words, a host device according to the second embodiment of the invention may be slightly more costly than a host device according to the first embodiment of the invention. However, the use of a Connected Tag has specific benefits for network joining and therefore the second embodiment is useful if it is implemented in combination with the writing of network parameters into the Connected Tag in order to enable the host device to join a network, for example. Furthermore, the use of a Connected Tag has the benefit that the association between the identity of the host device and its geographical location is initially stored in the memory of the host device, rather than in the memory of the localization device. This means that once the host device becomes part of a functioning (wireless) network, it can simply send the association between its location and its (dynamic) network address to other interested nodes and/or to the building commissioning system. Subsequently, further steps may be taken to configure the host device as a functioning element in the building control system.

The unique identifier of the host device according to the first embodiment will not necessarily be a network address that can be used without effort to send a message to the host device. At the time of commissioning (i.e. at the time of localization and possibly network joining) the host device may not have obtained a (dynamic) network address yet, for example, because no sufficient number of wireless nodes (e.g. host devices) is commissioned yet to create a mesh network with full coverage. However, even if the host device has obtained a (dynamic) network address, it cannot expose that address through the (read-only) barcode, QR-code, or (unconnected) RFID-tag. This means that the localization device and/or the building commissioning system have to take additional and possibly complicated steps to translate the unique identifier into a usable (dynamic) network address. Especially in a heterogeneous network topology this operation may be complicated.

It should furthermore be noted that creating the above-mentioned association and storing it in the host device is achieved without powering up the host device. The host device does not have to tap into its energy supply for this operation to take place. This may be beneficial in case the host device is an energy-harvested wireless sensor node.

After localizing the host device using either embodiment, further optional steps may be taken to configure the building control system. As mentioned above, configuration involves establishing control relationships between various host devices in a network. Two approaches can be distinguished: design-based installation and install-based designation.

In case of design-based installation, a design of the building control system has been made before installation and commissioning takes place. The design involves a map of the building and on that map each device to be installed is drawn at its intended physical location.

In one variant the location of the host device, as determined by any of the inventive methods, is expressed as (x, y, z)-coordinates and these coordinates are compared with the coordinates of each of the devices appearing on the design. The host device is subsequently identified as being the closest match on the design (i.e. the device on the map whose intended location is closest to the actual location of the host device).

As an optional feature, the host device may additionally expose information about its type (e.g. lamp, switch, valve) and this information may be used to obtain a more accurate match (i.e. "identify the closest device of type A at location (x, y, z)" rather than "identify the closest device at location (x, y, z)"). In the first embodiment the type information may be encoded in the barcode, the QR-code, or the RFID-tag. In the second embodiment the Connected Tag may also be readable by the localization device over the RFID interface and expose the type information in that way. In any embodiment the device type information may be obtained indirectly from the building commissioning system or the host device itself using the unique identifier of the host device.

In another variant—where (partially) manual means for localization, i.e. map touching, are used—the map displayed on the localization device may actually be a representation of the design of the building control system and may specifically include representations of the devices (to be) installed. In this case, a direct association between a device in the design and the host device may be made without the intermediate step of using (x, y, z)-coordinates.

In yet another variant, the location of the host device may be determined using manual or automatic means and subsequently the (x, y, z)-coordinates thus obtained may be used for automatically matching the host device to a device appearing on the design using shortest distance to (intended) location and optionally the type of the device. However, it is known that the resolution of the automatic means for determining location may be limited. Similarly, the resolution of manual means for determining location may be limited. Taking the inaccuracy of the means for determining the location into account, a plurality of devices appearing on the design may be identified as possible matches for the host device. In this case, further user interaction may be initiated to resolve the conflict (e.g. "Is it the left or the right light switch you're currently localizing?").

In case of install-based designation, no design of the building control system exists a priori, or at least no control relationships are explicitly established in that design. Instead the control relationships are inferred from the relative locations of the various host devices with respect to each other.

For example, if a light switch and a lighting luminary are localized in the same room, a control relationship between them can be established automatically, i.e. the switch will control the luminary from that point onwards. According to another example, if a temperature sensor, a temperature control knob and a heater are all localized in the same room, a control loop involving the temperature sensor, the control knob (for setting the set point) and the heater can be established automatically. In that case, the aim of the control loop is to actuate the heater to achieve the set point set by the control knob by using the sensor to know the actual temperature. Similarly, the ambient light sensor located in a room most closely to a luminary in that room will be used to establish a control loop for daylight dependent dimming. In that case, the location of the first device expressed as (x, y, z)-coordinates may be mapped to room numbers or zones within rooms.

The present invention may also be used to advantage in environments other than smart buildings, for example for improving so-called Smart Poster applications. Smart Posters are posters which contain a machine-readable unique identifier in the form of an RFID/NFC tag. This RFID/NFC tag can be read out by people passing by, simply by touching the poster with their phone. The phone will read a URL containing the tag's UID and a counter and use this to contact a back-end to obtain further information. The back-end will provide information based on (amongst others) the geographical location of the phone. Furthermore, the back-end will collect statistics (e.g. how often is a poster in a particular location touched). A problem with this is how to associate the unique identifier (UID) of the tag with the geographical location of its Smart Poster. In accordance with the present invention this could be solved as follows: when putting up Smart Posters in the field (e.g. gluing them on billboards) the Smart Posters are touched with a GPS-enabled phone. This causes the association of the geographical location information and the URL, i.e. the UID, to be sent to the back-end. Alternatively, the GPS-enabled phone determines the geographical location information and attaches it to the URL, i.e. the UID, by writing it to the RFID/NFC tag of the Smart Poster.

The above-mentioned embodiments illustrate rather than limit the invention, and the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. The invention may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 host device
102 localization device
104 reader/writer unit
106 controller
108 memory
110 wireless network interface
112 means for determining location
114 host processor
116 host memory
118 host controller
120 wireless network interface
122 machine-readable unique identifier
202 connected tag
204 non-volatile memory
206 RFID interface
210 host connection
212 optional wake-up

The invention claimed is:
1. A locating method for locating a host device in a control system, the locating method comprising:
determining geographical location information of the host device by a combination of coarse positioning by automatic means prior to refining of automatically determined geographical location information by manual means, relative to a localization device when the localization device is brought in close proximity of the host device for Near Field Communication (NFC), wherein the localization device is configured to refine a coarse geographical location information from the automatic means by sensing a touched position on a map;
associating the geographical location information with a unique identifier of the host device, wherein the localization device determines the geographical location information of the host device based on its own geographical location and writes the geographical location information into a memory unit of the host device, and the host device associates the geographical location information with its unique identifier; and using the geographical location information of the host device to establish a localized control relationship in a particular room between the host device and further host devices in the particular room, wherein the localized control relationship is inferred from relative locations in the particular room of the host device and the further host devices.

2. The locating method as claimed in claim 1, wherein the memory unit is comprised in a RFID tag connected to the host device.

3. The locating method as claimed in claim 2, wherein the localization device writes the geographical location information into the memory unit of the RFID tag while the host device is in an off state or a low-power state.

4. The locating method as claimed in claim 3, wherein the RFID tag wakes up the host device in response to the writing of the geographical location information into the memory unit by the localization device.

5. The locating method as claimed in claim 1, wherein the host device is a sensor.

6. The locating method as claimed in claim 1, wherein the geographical location information of the host device is derived from the geographical location of the localization device by determining a direction and a distance of the host device relative to the localization device.

7. A computer program product comprising program elements executable by the locating device or the host device, wherein each program element comprises non-transient program instructions which, when being executed by said locating device or host device, cause said locating device or host device to carry out or control respective steps of the locating method as claimed in claim 1.

8. A portable localization device, for use as the locating device in the locating method as claimed in claim 1.

9. The locating device as claimed in claim 8, further comprising:
a user interface for manually determining the geographical location information.

10. The locating device as claimed in claim 9, wherein the user interface comprises a touch screen for displaying the map.

11. The locating device as claimed in claim 8, further comprising:
a user interface for manually refining automatically determined geographical location information.

12. The locating device as claimed in claim 8, being configured to determine its own geographical location by receiving an input signal from a global positioning system.

13. The locating device as claimed in claim 8, being configured to receive further location-related information through a keyboard configured to capture user input.

14. The locating device as claimed in claim 8, being configured to determine its own geographical location by receiving an input signal from an indoor positioning system.

15. The locating device as claimed in claim 8, being configured to receive further location-related information through a microphone configured to capture user input.

16. The locating device as claimed in claim 8, being configured to receive further location-related information through a RFID interface configured to read out an RFID tag carrying information indicative of the location of an object to which the RFID tag is attached.

17. The locating method as claimed in claim 1, wherein the host device is a luminary.

18. The locating method as claimed in claim 1, wherein the host device is a HVAC-related actuator.

* * * * *